United States Patent [19]

Behr et al.

[11] 4,007,493
[45] Feb. 8, 1977

[54] TRACK POSITIONING SYSTEM FOR MAGNETIC TRANSDUCER HEAD

[75] Inventors: Michael Isaac Behr, South Pasadena; Norman Stephen Blessum, Thousand Oaks; Wilfred Dean Iwan, Sierra Madre, all of Calif.

[73] Assignee: Burroughs Corporation, Detroit, Mich.

[22] Filed: May 6, 1975

[21] Appl. No.: 574,872

[52] U.S. Cl. .................................. 360/77; 360/76
[51] Int. Cl.² ........................................ G11B 21/10
[58] Field of Search ................ 360/77, 76, 78, 75, 360/106, 135, 21

[56] References Cited
UNITED STATES PATENTS

| | | | |
|---|---|---|---|
| 2,938,962 | 5/1960 | Konins et al. | 360/76 |
| 3,034,111 | 5/1962 | Hoagland et al. | 360/77 |
| 3,175,205 | 3/1965 | Auyang | 360/77 |
| 3,185,972 | 5/1965 | Sippel | 360/76 |
| 3,479,664 | 11/1969 | Stuart-Williams et al. | 360/77 |
| 3,686,649 | 8/1972 | Behr | 360/77 |

Primary Examiner—Alfred H. Eddleman
Attorney, Agent, or Firm—Nathan Cass; Kevin R. Peterson; Edward J. Feeney, Jr.

[57] ABSTRACT

Data is recorded on a magnetic recording disk with data transducers adjustably positioned relative to a data zone. First and second control tracks are interspersed with the data zone in a parallel relationship. Positioned over each control track is a position sensing transducer mechanically linked to the data transducers. The control transducers each comprise core gaps used both for prerecording and subsequent reading of a position control pattern along their respective tracks. The core gaps extend diagonally at a predetermined angle to the direction of movement of the medium and provide control patterns defining multiple transition groups, the number of transitions related to a corresponding number of data tracks to be read by the data transducers. Positioning of the position sensing transducers is accomplished by measuring the time relationship between the output pulses of the two control tracks and by relating the resulting time differential to the radial distance over which the control head is to be actuated.

13 Claims, 9 Drawing Figures

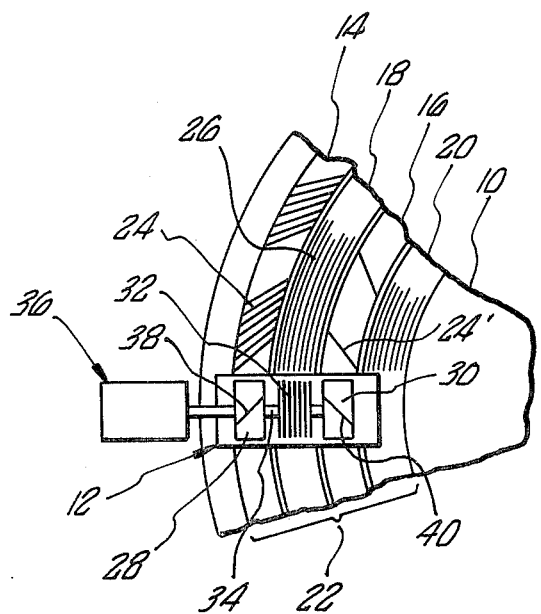
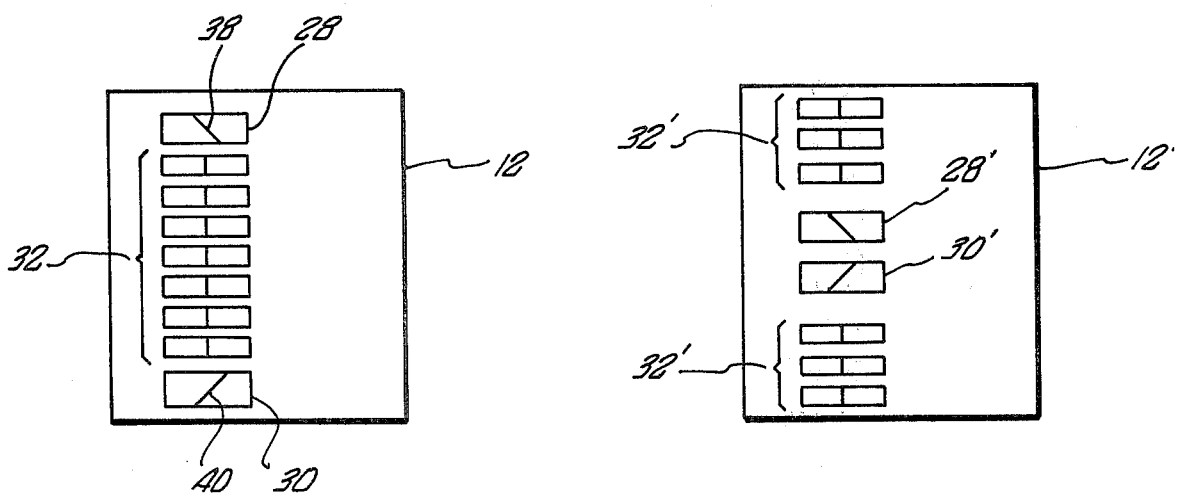

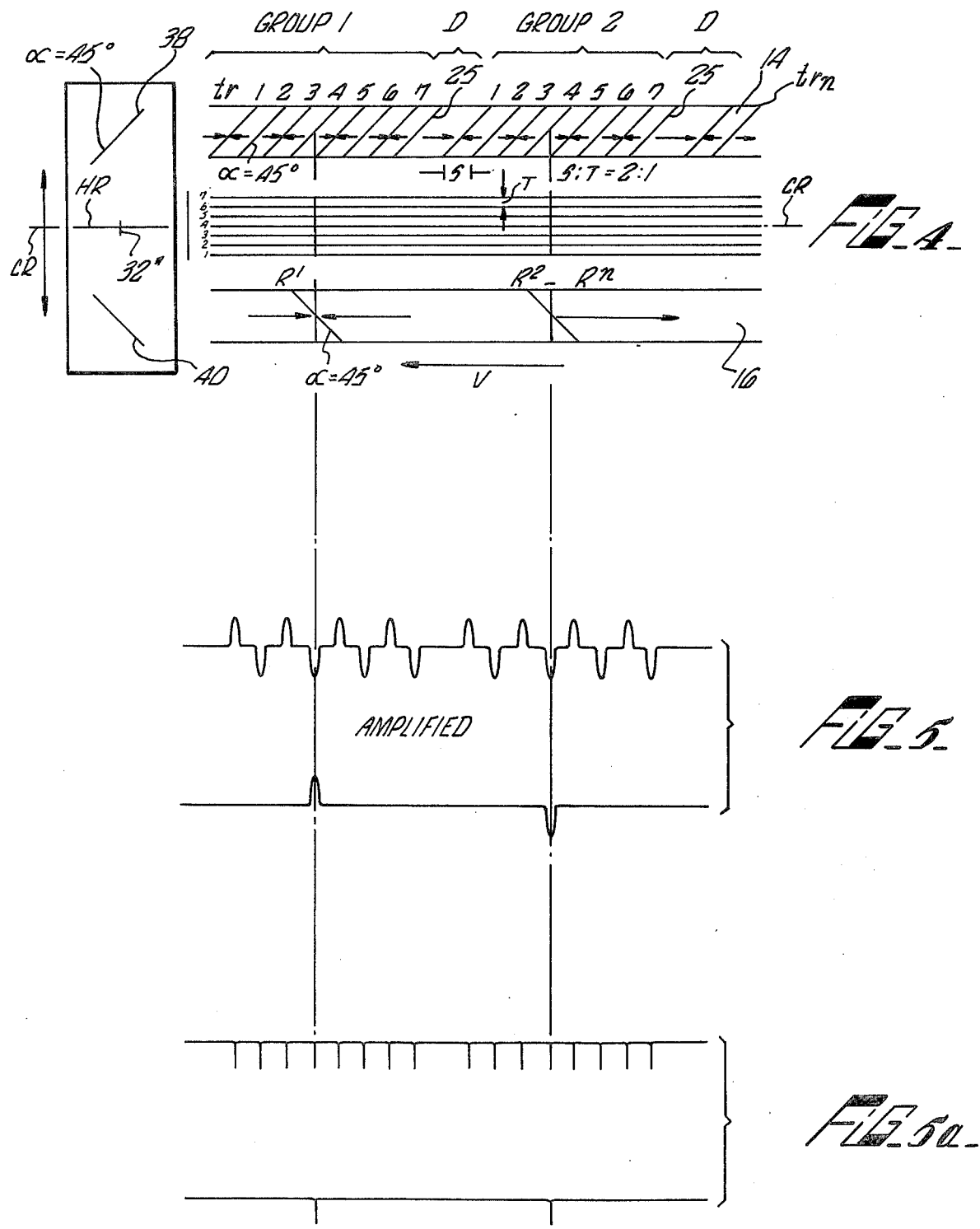

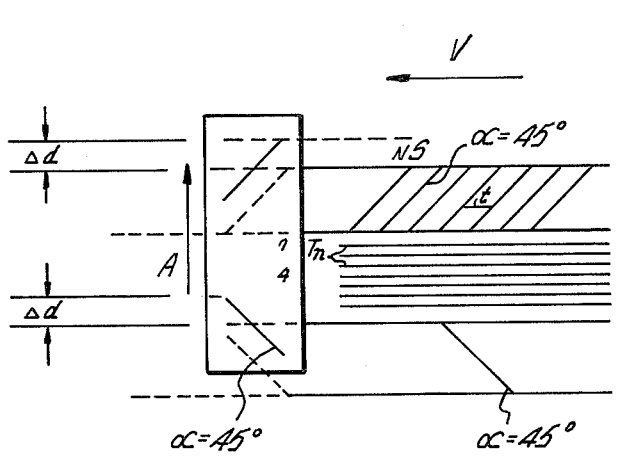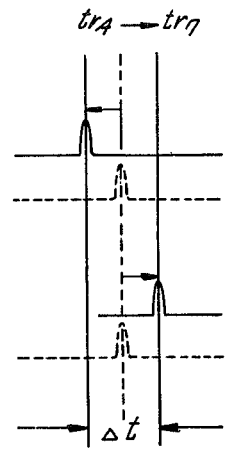
FIG. 6
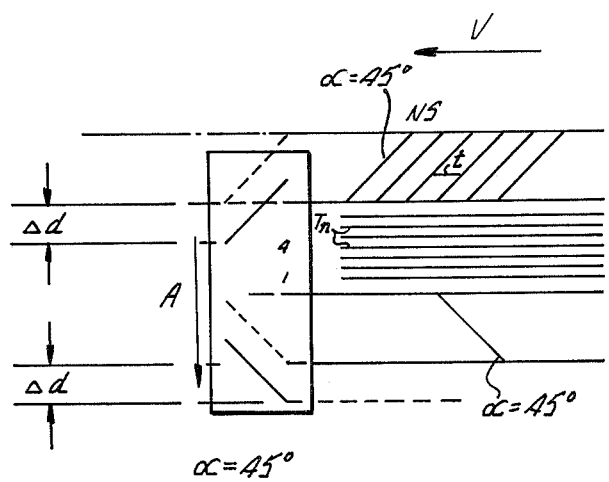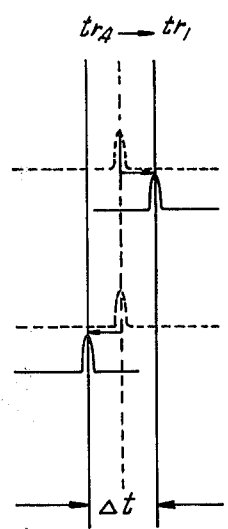
FIG. 6a

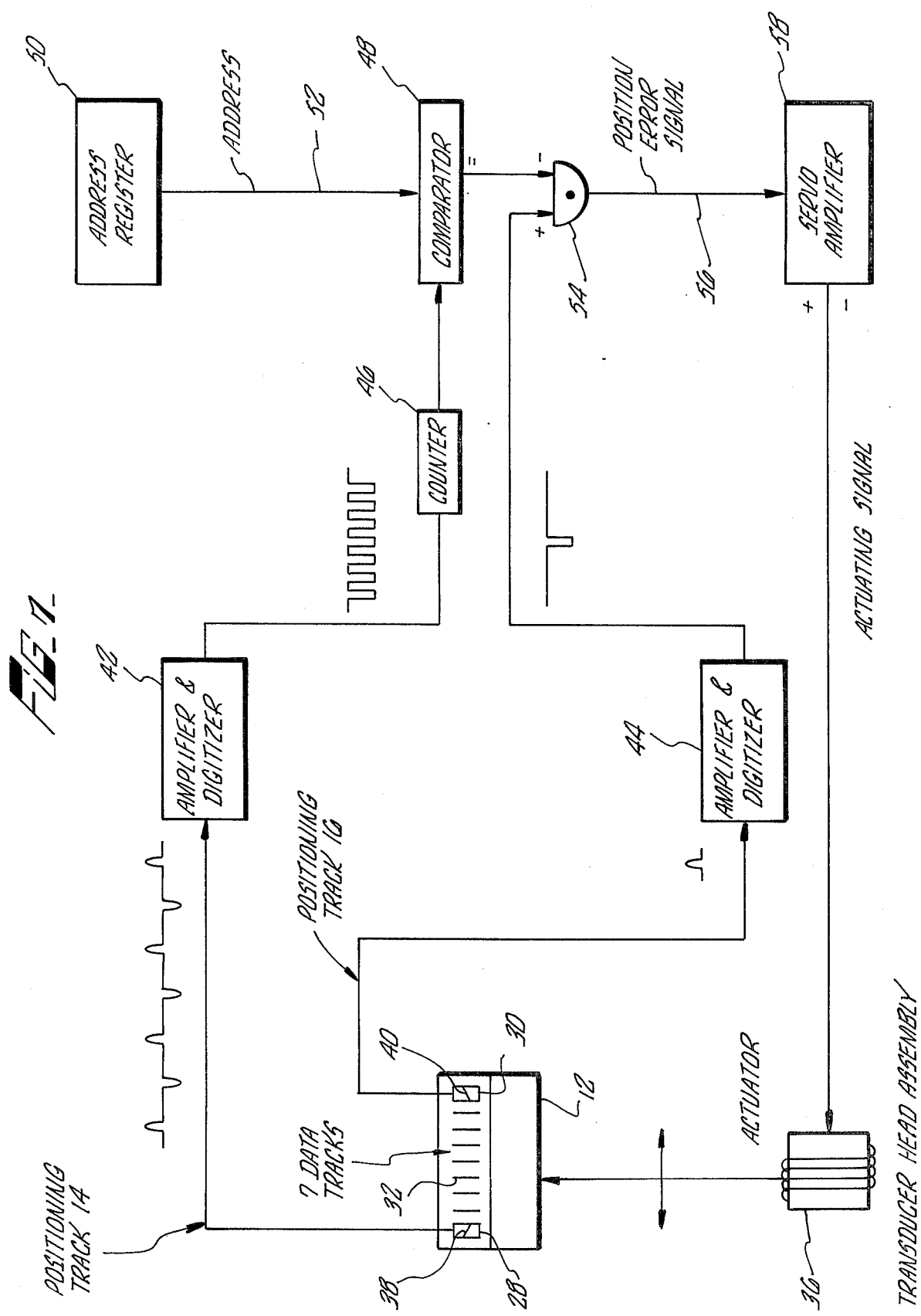

TRACK POSITIONING SYSTEM FOR MAGNETIC TRANSDUCER HEAD

CROSS-REFERENCE TO RELATED PATENT

U.S. Pat. No. 3,686,649, issued Aug. 22, 1972, to Michael I. Behr, assignor to the assignee of the present invention. The referenced patent discloses a method and apparatus for positioning a magnetic transducer adjacent the recording medium on a face of a magnetic recording disk.

BACKGROUND OF THE INVENTION

1. Field of the Invention

This invention in general relates to a position control system for use in magnetic recording devices and more particularly to a system for providing radial positioning of a magnetic transducer head through recording and reproducing track positioning or control information along a pair of control tracks of a moving magnetic recording medium.

The invention is based on the realization that a track address command can be represented as a fixed time interval, and on the fact that radial displacement of a magnetic transducer head relative to a magnetic recording medium can be determined through measuring a time differential, where the duration of the interval varies in accordance with the extent of radial displacement.

2. Description of the Prior Art

The art of information storage has developed rapidly with constant improvements in the amount of information that can be stored in a particular media and in the time required for access to this stored information. For information that must be stored frequently, but not in a fixed sequence, the time for retrieval becomes of paramount importance. Retrieval of information stored at random can be excessively time consuming in certain applications. Therefore, apparatus for magnetic storage of data and servo information on cylinders and disks have been developed in the art to permit random access to recorded data by direct positioning of a magnetic transducer head over the portion of the cylinder or disk containing the information sought. Read/write transducers as well as control transducers are mounted in a head assembly and extend adjustably over the recording surface of the disk, the head being supported by an arm or linkage which is stepped radially by a linear motor. The disk rotates at generally high speeds and accurate positioning of the magnetic head in radial distance relative to the axis of rotation is imperative. During high speed rotation of the disk, thin air layers are created and follow the disk surface. A properly designed and mounted head system will "fly" on the air layers in close proximity with a disk surface.

Information is recorded in serial digital form along a plurality of concentric tracks on the magnetic recording surface of the disk. Each data transducer in the head assembly is positioned over a track on the recording surface of the disk for a given linear position of the head. Selection of an individual track is accomplished by means of, for example, a servo system including one or more servo transducers. The tracks may be divided into sectors such that only a segment of the track may be selected for reading or recording. It is apparent that the narrower the tracks are and the smaller the tolerance permitted between tracks, the higher the density and the greater the amount of information that can be stored on a given disk surface. Consequently, positioning systems of the type utilized, for example, in data disk drives must be highly reactive in positioning a magnetic head and moreover must not only have a fast access time enabling retrieval of stored data information, but must also be able to accurately position the transducer head adjacent any given one of a multitude of closely spaced tracks.

Prior art magnetic track detection and measuring transducers are known which are sufficiently accurate for use with high velocity head positioning systems of the type under discussion. An example of such a system is illustrated and described in the aforementioned U.S. Pat. No. 3,686,649. The patent discloses a technique for precise control of magnetic recording transducers adjacent the face of a rapidly rotating disk in a magnetic memory system. A series of information or data transducers are rigidly coupled to a position sensing transducer and mounted so that the assembly is adjustably movable in a radial direction relative to the disk. A number of data tracks in an information zone extends circumferentially around the disk. Concentric with this information zone is a control or servo track used for positioning the position sensing transducer.

Within the control channel, there are periodic magnetic transitions in lines skewed alternately clockwise and counterclockwise from the disk radius so as to form a series of interlaced trapezoidal regions with the transition between adjacent regions being diagonal to the circumferential extent of the control channel. As the position sensing transducer is shifted radially, the time interval between sensing of successive magnetic transitions varies and this sensed time interval is compared with a reference signal to give a position error signal used for servo control of the position sensing transducer.

The magnetic position sensing transducer is provided with a trapezoidal core gap for recording the positioning signals in the control track. In the embodiments illustrated in the patent, the trapezoidal gap is either completely free of magnetic material or a trapezoidal shunt may be provided within the gap and spaced apart from the transducer pole pieces for simultaneously produced, spaced apart diagonal magnetic transitions along the control track.

The position sensing transducer and data transducers are mechanically linked together and supported on an arm, the latter being actuated by a linear motor in response to error signals applied thereto by servo control circuitry.

According to the system disclosed, initially the entire control channel is polarized in one direction following which the separate write transducer is moved along the control channel to reverse the polarity in selected trapezoidally-shaped areas.

One disadvantage encountered with this system, however, is the fact that in addition to the servo "read" transducer used for reproducing position control information corresponding to a predetermined servo control pattern recorded on the control channel, a separate servo "write" transducer not ganged to the read transducer and non-unitary with the transducer support assembly, is to be used for recording such control patterns.

The undesirability of such a system utilizing separate read and recording transducers which individually read and write positioning information, emphasizes the desirability to provide a system in which track positioning information is both recorded and, subsequently, reproduced by the same positioning transducers located in a single transducer head assembly.

SUMMARY OF THE INVENTION

Accordingly, it is an object of the present invention to provide a track detection and positioning system for a random access magnetic memory in which a transducer head comprises first and second position sensing transducers utilized both for prerecording and subsequent reading of a positioning control pattern, enabling selective servoing of one of a plurality of data transducers into alignment with a desired track on a high-speed recording medium. The position sensing transducers may be arranged singly or pair-wise adjacent either side of the data transducers or "sandwiched" intermediate the data transducers, one adjacent the other.

Briefly described, the invention contemplates a positioning system for a magnetic head assembly in which the core gaps of the position sensing transducers are disposed in angular relation relative to the longitudinal axes of their respective positioning track, the latter tracks extending in parallel and each being recorded with skewed control transitions. Typically, the transitions are disposed in angular relation to an axis of the recording medium, with the control transitions of one positioning track disposed along one diagonal to the axis of the track and the transitions of the second positioning track applied along the opposite diagonal, which manner of recording allows closer spacing between adjacent tracks on the recording medium.

To provide a track positioning system, the transducer position error signal must show a measure of the distance "off" track and a sense or sign indicating the direction and the degree of movement required to reach the desired track. In addition, the positioning characteristic of the system should be arranged such that the magnetic head initially is positioned at a starting point or "home" position along either side of which and including this point itself, data signals are recorded. To accomplish this, positioning signals may, for example, be written along positioning tracks on either side of an odd number of data tracks disposed in evenly spaced relation between the positioning tracks, the center track serving as the home position from which the head is actuated in either direction, radially of the disk. The positioning signals are written such that they are read back with zero phase differential when the head is directly positioned over the track which constitutes the starting position of the head. However, if the head is moved across the tracks in either direction from its home position to a selected track, a time differential will result between the outputs of the positioning transducers, in which the time difference is directly proportional to the radial displacement of the head.

In a specific example of the present system, a servo system generates two time varying control pulse series in response to rotational movement of a cyclic recording medium such as a magnetic disk. When the head is to be displaced radially relative to the disk, the time difference between the two series of pulses is varied in accordance with the radial position of the transducer. The time displacement relationship is determined by a unique circumferentially varying reference pattern on the disk, defined by areas of differing sensible properties. The two pulse series are applied to a coincidence circuit which generates a timing signal to control the position of the head in response to the difference between a desired position and the actual transducer position.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIG. 1 is a fragmentary view of a magnetic disk containing a number of recorded tracks and illustrating a multiple transducer head assembly in which the subject matter of the present invention is incorporated;

FIG. 2 is a schematic view of one arrangement of a multiple transducer head according to this invention;

FIG. 3 is a view similar to FIG. 2, however, illustrating an alternative arrangement of a multiple transducer head according to the invention;

FIG. 4 is a schematic illustration showing the orientation of lines of flux representing a typical positioning pattern of magnetic transitions along the positioning tracks, and illustrating the magnetic head positioned relative to a predetermined data track;

FIGS. 5 and 5a are graphical representations of waveforms representing the course in time of signals sensed by the position sensing transducers with the head versus tracks positioned in the position of FIG. 4;

FIGS. 6 and 6a graphically illustrate the basic concept of determining timing and phase relationship between output pulses from the position sensing transducers as the magnetic head is displaced laterally relative to the positioning tracks; and FIG. 7 is a diagrammatic illustration of a track positioning system according to the invention, illustrating the circuit means for actuating the magnetic head assembly in response to track positioning information.

DESCRIPTION OF THE PREFERRED EMBODIMENT

In order that the invention may be readily understood and carried into effect, the principles underlying the present concept of head versus track positioning will initially be discussed.

In accordance with the present invention there is provided a magnetic head positioning system for accurately detecting the relative position between a single magnetic multi-transducer head and the data tracks of a recording medium, e.g., a magnetizable disk, and in which a pair of parallel positioning tracks is marked with diagonal or skewed magnetic transitions so that when the head is positioned above the positioning tracks, a pair of pulse trains derived from the magnetic transitions and indicative of the head position, will be read. The magnetic transitions are prerecorded and subsequently reproduced by magnetic interaction between the coils of a pair of position sensing transducers of the head and the magnetizable surface of the tracks in accordance with a conventional method of binary saturation recording.

The theory of positioning the head versus data tracks depends on the recording pattern of the transitions along the positioning tracks, the transitions of the first positioning track providing data track identifying pulses, (hereinafter referred to as "track identifying pulses") and the transitions of the second positioning track providing reference or index pulses. The index pulses are measured with respect to the track identifying pulses to determine the instantaneous position of the head versus data tracks and to provide a mode both for track following and seeking, the seek mode effecting movement of the head in a desired radial position until a given index pulse is aligned or coincides with the track identifying pulse corresponding to the data track to be selected. The recording arrangement is such that the total number of transitions providing the track identifying pulses is equal to the total number of data tracks to be selected, i.e., the total number of these transitions equals the total number of data track positions to be assumed by data transducers of the transducer head.

In one arrangement of the invention, the transitions of the first track are subdivided into equal discrete groups, for instance, odd numbered groups, e.g., a multitude of groups of seven transitions, repeated regularly around the track. Typically, only one transition of the second track is provided per each group of transitions of the first track and recorded simultaneously therewith. Since it is assumed that the groups of transitions along the first track are odd numbered groups, it may further be assumed that, in this instance, transition four of the group of seven represents the "home" or "start" position of the head from which the latter is moved either radially inwardly or outwardly, depending upon the direction of actuation of the head. Inasmuch as the number of transitions of the first positioning track equals the number of individual data tracks, it will be clear that, in this instance, track four represents the center data track whereby when the head is positioned above this track, the index pulse derived from the single transition of the second track will be aligned with the fourth track identifying pulse indicating that the head is reading data track four.

Since the transitions of the two positioning tracks do not lie along an axis coincidental with a radius of the medium but, instead, are disposed at an angle $\theta$ relative thereto, the timing and phase difference between the output pulses of the two positioning tracks are determined by the degree of "offset" along the radius between the core gaps of the position sensing transducers and the respective transitions of the positioning tracks, i.e., in one direction of radial movement of the head the track identifying pulses are lagging in phase relative to the index pulses while in opposite direction of radial head movement the track identifying pulses are advanced in phase with respect to the index pulses. When the core gaps are positioned in line with the transitions and centered across the width of the positioning tracks, there will be no time or phase difference. In measuring the difference in time ($\Delta t$) between the track identifying and index pulses, the radial displacement ($\Delta d$) can readily be determined in that the time difference ($\Delta t$) is directly proportional to the radial distance ($\Delta d$) moved by the head.

Since the time difference ($\Delta t$) between the output pulses of the two positioning tracks is a direct function of radial movement ($\Delta d$) of the head, the timing relation between the output pulses will be $\Delta t = 0$ when the head is in its home position in which, as hereinbefore explained, the core gaps of the head are centered in line across the positioning tracks and in which condition the width of the core gaps is equal to the width of the positioning tracks.

However, if the head is moved radially across the positioning tracks by some distance $d$, a phase difference ($\Delta t$) will occur between the track identifying and index pulses, the direction of ($\Delta d$) depending upon which direction the head is moved. If, for instance in the example given, the head is moved radially outwardly from its home position, track four, towards track seven, then the index pulse of the second track is shifted to the right from an initial index pulse position aligned with track identifying pulse four to a subsequent index pulse position aligned with track identifying pulse seven.

The transitions of the positioning track which provide the track identifying pulses are prerecorded at predetermined equal time intervals at a predetermined linear speed (V) of the medium moving past the head, these time intervals representing the spacings between the data tracks at an angle $\theta$ of the transitions. Typically, if T is the track-to-track spacing and the distance between the transitions is made 2S at a transition angle of 45°, the corresponding time interval ($t$) equals $2S/V$, ($t = 2S/V$).

In performing the invention, the track identifying and index pulses are initially amplified and digitized and the amplified and digitized signals are subsequently "differenced" in a pulse timer. The output of the timer is coupled to the input of a comparator for phase comparison between the resulting signal from the timer and a command or target address signal from an address register. Following comparison of the resulting and the reference signals, the comparator applies a position error signal via a servo amplifier to a linear motor mechanically linked to the head and which radially displaces the latter a desired distance in the proper direction, radially of the disk.

Having described the principles underlying the concept of the invention, attention is presently directed to the drawings in which like reference numerals index like parts. With attention initially directed to FIG. 1, there is shown a fragmentary portion of a rotatable magnetic storage disk 10 for use with a multi-transducer head assembly 12 according to the invention. At least one surface of the disk 10 is provided with a magnetizable coating and data and positioning information may be stored or reproduced therefrom in circular concentric tracks by data and position sensing transducers of the assembly 12, the tracks each being identifiable by an address so that the recordings can be retrieved.

The transducers, in conventional manner, cooperate with the magnetizable surface to convert electrical energy into a magnetic field and thereby permeate the magnetizable surface to record thereon, or to detect the magnetic fields emanating from previous recordings and convert the detected magnetic fields into electrical signals.

While the invention is described as being incorporated in a single-disk magnetic storage system, it should be appreciated by those skilled in the art that the inventive features may be used with equally beneficial results in other data storage devices including, for example, disk pack or file systems, magnetic tapes, drums and strip files.

As can be seen from FIG. 1, digital information in the form of magnetic signals is recorded in the circumferential direction along a plurality of concentric, circular positioning and read/write or data tracks 14, 16 and 18, 20, respectively, defined on the illustrated face of the disk 10. The tracks are arranged in parallel, adjacent relationship relative to one another and are generally equally spaced over the available recording zone 22 of the disk, the tracks having graduated radii of equally increasing magnitude from the innermost to the outermost boundaries of the recording zone. Positioning signals 24 are recorded regularly around the positioning tracks 14, 16 while the data tracks 18, 20 have a multitude of data signals 26 written thereon.

Although in the illustrations of FIG. 1, four recording bands have been shown, it will be understood that such number is to be interpreted as illustrative only. In a typical application, for example, the storage disk has a diameter of 14.5 inches with a track density of 400 tracks per inch and greater, a 400 track disk having a corresponding track pitch of 2.5 mils.

As illustrated, the positioning signals 24 constitute a multitude of skewed magnetic transitions which, in order to achieve closer track spacing, are applied with their magnetic axes lying at a diagonal, or about 45° to the longitudinal axes of the positioning tracks 14, 16. This orientation is schematically illustrated with the transitions shown as slanted, equally spaced, parallel bars. The transitions of the track 14, as shown, are disposed in a first direction while the transitions of the track 16 are oriented in a second direction and provide a recorded positioning pattern laterally of the data track 18. This method of recording a servo pattern not only allows closer spacing of the tracks but enables such spacing without causing interference by adjacent undesired tracks. Adjacent tracks are recorded so that the change in flux direction of a given neighboring track crosses the angularly displaced transitions in a manner to reduce magnetic coupling with a magnetic transducer.

In a typical disk arrangement of the invention, the width of the data tracks is 1.3 mil, the width of the positioning tracks 50 mils, and the track-to-track spacing 1.8 mil.

The multi-transducer head assembly 12 is seen to comprise magnetic position sensing transducers 28, 30 and magnetic read/write or data transducers 32. The transducers 32, illustrated in FIGS. 1 and 2, are disposed intermediate the position sensing transducers 28, 30. Alternative arrangements, of course, are feasible as is shown, for example, in FIG. 3 in which the position sensing transducers 28', 30' of the head assembly 12', are disposed in the center, intermediate the data transducers 32'.

As will be appreciated from the arrangement shown in FIG. 3, the transducers 28', 30' provide a pair of positioning tracks positioned in parallel, directly adjacent each other, in "sandwiched" relation with the data tracks while with the arrangement of the head assembly shown in FIGS. 1 and 2, positioning tracks are recorded which extend in parallelism, laterally of the data tracks.

The head assembly shown in FIG. 1 is disposed in magnetic relation to the available storage zone 22 of the disk 10 and is mounted on a linkage 34 for radial movement under the control of a controllable linear actuator 36 to which the linkage 34 is mechanically coupled.

In a typical arrangement of head assembly, the core width of the data transducers is 1.3 mil, the core width of the servo transducers 50 mils, the spacing between adjacent transducers 1.8 mil, and the actuation distance of the head ±25 mils.

In operation, the disk 10 is rotated at high speed during which thin air layers are created which follow the disk surface, in which condition the magnetic head will "fly" on the air layers in close proximity with the disk surface with each transducer in the head assembly positioned over a track for a given linear position of the head assembly.

In accord with the present invention, the positioning signals or transitions 24, 24', along the tracks 14, 16, FIG. 1, are prerecorded by the core gaps 38, 40 of the position sensing transducers 28, 30 and are also read back by the same gaps to determine the momentary position of the head versus tracks.

As shown, the gaps 38, 40 extend at an angle of 45° relative to the longitudinal axes of the positioning tracks 14, 16, the width of the core gaps being chosen such as to be equal to the widths of the positioning tracks in a predetermined position, i.e., when the gaps are centered in line across the positioning tracks, the width of the gaps equal that of the positioning tracks.

For exemplary purposes only, FIG. 4 shows an arrangement in which multiple groups of odd-numbered transitions $tr_1$–$tr_7$, are repeated at regular intervals around the positioning track 14, the respective groups being separated from each other by a distance D. This given separation distance provides a suitable means for recognition of the beginning of each group of transitions when the latter are being read back during track positioning of the head assembly 12. As shown, the control track 16 contains only one transition $R_1$–$R_2$, $R_n$, per each group of transitions $tr_1$–$tr_7$. Additionally, a rephase signal 25 is provided at the end of each group of transitions $tr_1$–$tr_7$. The transitions $tr_1$–$tr_7$ of track 14 provide track identifying pulses while the transitions $R_1$–$R_2$ provide reference or index pulses.

As regards the recording arrangement of the transitions R, it should be noted that in the arrangement shown, $R_1$ is prerecorded simultaneously with transition 4 of the first transition group $tr_1$–$tr_7$ while the pulse $R_2$ is prerecorded subsequently and simultaneously with transition 4 of the second group of transitions $tr$. As will be appreciated, consecutive transitions $R_n$ are all written at the same time and in alignment with one from each group of consecutive transitions $tr_n$.

The reference of index pulses shown in FIG. 5 are derived from the recording scheme of FIG. 4 and are measured with respect to the track identifying pulses to determine the instantaneous position of the head versus the data tracks and to provide both a track following and seeking mode, the latter mode effecting movement of the head in a desired radial position, inwardly or outwardly of the disk, in response to a head position instruction, until a given index pulse coincides with one of the track identifying pulses corresponding to the data track to be selected.

Since in the arrangement shown in FIG. 4 the total number of transitions of the groups $tr$ is seven and whereas the total number of such transitions equals the total number of data tracks to be selected, the number of data tracks, in this instance, is also seven, with this number of tracks to be "serviced" by a single read/write or data head 32''.

In the arrangement shown, the transition $R_1$, $R_2$ are aligned with the center transitions $tr_4$ of the respective odd-numbered groups of transitions $tr$, the transitions $tr_4$ corresponding to the data track 4, representing the "home" or "start" position, adjacent which the transducer 32'' of the head is initially positioned and from which the latter, upon displacement of the head in response to an address command, is moved either radially inwardly or outwardly towards a selected, neighboring data track, viz. one of the tracks 1–3 or 5–7.

In the head position shown, the core gaps 38, 40 are positioned in line with the transitions R and $tr_4$ and centered across the width of the positioning tracks 14, 16, which condition is exemplary illustrated by the head index or reference line HR aligned with the center data track line CR, the latter being coextensive with track 4 of the data tracks. Since radial displacement ($\Delta d$) of the head is directly proportional to the difference in time ($\Delta t$) between the track identifying pulses and index pulses ($\Delta t \propto \Delta d$), as hereinbefore explained, it will be readily apparent from FIG. 4 that since the head has not been displaced ($d = 0$) and is in its "home" position with the core gaps centered across the width of the positioning tracks and, hence, the degree of radial offset between the core gaps and the respective transitions is zero, there will be no time or phase difference between the resulting output pulses from the tracks 14, 16, respectively, FIG. 5.

However, if the head is moved radially across the tracks by some distance $d$, in which condition the core gaps are no longer positioned in line across the width of the positioning tracks, a proportional phase difference ($\Delta t$) will occur between the resulting track identifying and index pulses due to "shifting" of the pulse trains in directions opposite relative to one another, the direction of shifting depending upon in which direction the head is actuated. If, for example, the head is moved a certain distance $d$, radially outwardly of the disk, the core gaps, as a result, are moved a corresponding distance in the same direction relative to the positioning tracks and such that the core gap servicing the transitions $tr$ will detect these transitions "earlier" while the second core gap detecting the transitions R will detect the latter transitions "later" in time. Conversely, if the head is moved radially inwardly of the disk, the core gaps, likewise, are moved a corresponding distance $d$ in this direction and, in this case, the core gap servicing the transitions R will lead the core gap reading the transitions $tr$. Accordingly, depending upon the direction of actuation of the head from its home position, the leading edge of the track identifying pulses will either be advanced or delayed and, accordingly, the index pulses are delayed in time when the track identifying pulses are advanced or the index pulses are advanced in time when the track identifying pulses are delayed.

From the above it will be appreciated that instead of measuring the time intervals of the pulses directly, the invention provides a system by which a "timing clock" is built into one of the two parallel positioning tracks and which is achieved by recording the track identifying transitions of this track at intervals such that at a given speed of the medium moving past the head, the time intervals of the resulting track identifying pulses, upon measurement thereof by the index pulses derived from the second positioning track, will represent the distances between data tracks.

Accordingly, the method of track seeking is to provide movement of the head assembly in the desired direction until the index pulse is aligned with the track identifying pulse corresponding to the track to be selected.

If, for example as shown in FIG. 6, the head is moved radially outwardly from track four towards track seven, the track identifying pulses are advanced while index pulses are delayed and, as exemplary shown, are shifted to the right from a position initially aligned with track identifying pulse four to a position in which the index pulses are aligned with track identifying pulse seven in which $$\Delta t = \Delta d/V \text{ and } Tn = 2nS/V$$

where $T$ is the timing between reference pulses for $n$ tracks, $2nS$ the track-to-track spacing for $n$ tracks, and $V$ the linear speed of the disk at the head.

As shown in FIG. 6a, in actuating the head radially inwardly from its home position, track four, towards track one, the track identifying pulses are delayed while the index pulse is advanced in time and, as exemplary shown, is shifted to the left from the position initially aligned with track identifying pulse four to a position in which the index pulse R is aligned with track identifying pulse one, which condition satisfies the same equation as given hereinbefore with respect to FIG. 6.

It should be noted from the drawings that the time interval between the track identifying pulses is dependent upon the distance between the lines of magnetic transitions on the positioning track. Typically, the distance between the diagonal transitions is 2S at an angle $\theta = 45°$, where S is the spacing between tracks and, hence, the time interval between consecutive pulses is $t = 2S/V$. For example, if $S = 1.8$ mil., $V$ (the linear disk speed at this track) = 2000 inches/sec., $t = 1.8$ $\mu$/sec.

As will be appreciated, the width of the positioning tracks is related to the radial distance between the outer data tracks. For example, given a distance of 50 mils between track centers of the two outer data tracks, each positioning track width will be 50 mils, assuming a positioning transducer core gap width of 50 mils and a head actuation distance of ±25 mils.

The electronics associated with the positioning channels are shown in FIG. 7. The output of each positioning transducer 28, 30 is applied to amplifier-digitizers 42, 44 which, conventionally, are in the form of a saturated amplifier and which takes a sine wave input and provides a square wave output as, for example, shown in FIG. 5a. The output of the amplifier-digitizer 42 drives a 3-stage counter 46, contemplating seven data tracks, and which generates counts in accordance with the output of positioning track 14. These counts are continuously compared in a comparator 48 for equality with the output of an address register 50 which, in this arrangement, may also comprise three stages. At equality at the comparator 48 which thus determines coincidence, line 52 has a negative voltage which is passed through a two-input AND gate 54 only if the output of the digitizer 44 coupled to the second input of the gate 54 is at a negative potential. The output of the gate 54 comprises a position error signal on line 56 which drives a conventional servo amplifier 58, the latter providing a signal which excites actuator 52 of the "voice-coil" type. The actuator, in turn, is coupled to the arm 34 which carries the head assembly 12 and moves the latter radially with regard to the disk.

In using the above gating circuit to determine pulse coincidence, the uncertainty of timing is 5 $ns$ or in terms of positioning accuracy for the case in question, where the track-to-track spacing is 0.0018 inches and the corresponding pulse time is 1.8 $\mu$s, the % positioning error equals $$5/1800 \times 100 = 0.277\%,$$

assuming uncertainty of circuits of 5 $ns$.

Many modifications and variations of the present invention will be apparent to one skilled in the art. It is, therefore, understood that within the scope of the appended claims the invention may be practiced otherwise than as specifically described.

What is claimed is:

1. System for positioning a transducer head relative to a recording medium movable past the head, comprising:
   a first control recording on said medium for identifying a plurality of positions capable of being occupied by the head;
   first means associated with the first control recording to provide a series of pulses corresponding to said first recording;
   a second control recording on said medium for identifying a particular position of said plurality of positions;
   said first and second recordings extending in parallelism, circumferentially on said medium, and said first recording comprising a plurality of magnetic transitions extending at a first angle to the direction of motion of said medium, and said second recording comprising a single magnetic transition oriented at a second angle to the direction of motion of said medium;
   second means associated with the second control recording to provide a single pulse corresponding to said second recording;
   a circuit connected to said first and second means for providing a signal corresponding to the deviation of the position of the head from a desired position; and
   means connected to said circuit and capable of energizing the head for movement thereof in response to said signal.

2. The system of claim 1 wherein said first recording includes separate identification for each position capable of being occupied by the head.

3. The system of claim 1 wherein said first recording includes separate identification for each position capable of being occupied by the head, and wherein the position identifications are spaced equally relative to each other.

4. The system of claim 1 wherein said first recording includes separate identification for each position capable of being occupied by the head, and wherein each of the identifications are separated from the next one a distance proportional to the spacing between adjacent ones of said positions.

5. The system of claim 1 wherein said second recording defines a reference identification which provides said single pulse, the reference identification being recorded independently of the position of the head such that the time interval between readout of the series of pulses derived from the first recording and the single pulse derived from the second recording is variable and directly proportional to the amount of deviation between said desired position and said particular position of the head.

6. The system of claim 1 wherein said first recording comprises at least one odd-numbered group of circumferentially spaced identifications prerecorded on said medium, and wherein said particular position is located in the center of said odd-numbered group of identifications.

7. The system of claim 1 wherein said transducer head is a magnetic transducer head and said recording medium is a magnetic recording medium.

8. The system of claim 1 wherein said first means comprises a first control transducer in said head aligned with said first recording, and said second means comprises a second control transducer in said head aligned with said second recording.

9. The system of claim 1 wherein said first means comprises a first control transducer in said head including a first core gap extending at a first angle to the direction of motion of said medium, and wherein said second means comprises a second control transducer in said head including a second core gap extending at a second angle to the direction of motion of said medium.

10. The system of claim 1 wherein said first means includes first transducing means aligned with said first recording and said second means include second transducing means aligned with said second recording, said first and second means further comprising means for amplifying and digitizing the outputs from said first and second transducing means, and means for differencing the amplified and digitized outputs of said first and second transducing means.

11. System for positioning a magnetic transducer head radially relative to a magnetically active surface of a rotating disk, comprising:
    a first circumferentially extending control recording on said surface for identifying a plurality of positions capable of being occupied by the head;
    first transducing means associated with the first control recording to provide a series of pulses corresponding to said first recording;
    a second circumferential control recording on said surface for identifying a predetermined position of said plurality of positions, the second control recording extending radially spaced from and in parallelism with the first control recording;
    second transducing means associated with the second control recording to provide a single pulse corresponding to said second recording, the first and second recordings being arranged to provide, when sensed by said first and second transducing means, a specified coincidence of one of said series of pulses from the first recording with said single pulse from the second recording in a desired position of the head relative to said first and second recordings;
    a circuit connected to said first and second transducing means for providing a signal corresponding to the amount of deviation of the head between said predetermined position and said desired position; and
    means connected to said circuit and responsive to said signal for energizing the head for radial movement from said predetermined position to said desired position.

12. System for positioning a magnetic transducer head radially relative to a magnetically active recording zone on a rotatable disk, comprising:
    a number of parallel data tracks in said zone;
    at least one information magnetic transducer in said head for servicing said data tracks;
    a first circumferential control zone recorded in interspaced relation with the data tracks, the first control zone including a predetermined number of diagonal magnetic transitions corresponding to said number of data tracks and each identifying one of said latter tracks capable of being occupied by said information magnetic transducer;

first control magnetic transducer including a first core gap disposed angularly relative to a disk radius and aligned with the first control zone for transducing said predetermined number of transitions to provide a series of pulses corresponding to said number;

second circumferential control zone recorded in parallelism with the first control zone, the second control zone including a single diagonal transition aligned with a particular transition of said predetermined number of transitions for identifying a predetermined one of said data tracks;

second control magnetic transducer including a second core gap disposed angularly to a disk radius and aligned with the second control zone to provide a single pulse corresponding thereto, said first and second core gaps being disposed at an angle corresponding to the orientation of the diagonal of said transitions, and said first and second core gaps having a width corresponding to the radial length of said transitions;

nking means interconnecting said information magnetic transducer and said first and second control magnetic transducers for radial movement relative to said disk;

circuit connected to said first and second control magnetic transducers for providing a signal corresponding to the amount of deviation of the head from said predetermined position; and means responsive to said signal and connected to said linking means for energizing the head for radial movement thereof to said predetermined position.

13. System for positioning a transducer head relative to a recording medium movable past the head, said recording medium comprising a rotatable disk having a magnetizable surface thereon, said system comprising:

a first control recording on said medium for identifying a plurality of positions capable of being occupied by the head;

first means associated with the first control recording to provide a series of pulses corresponding to said first recording;

a second control recording on said medium for identifying a particular position of said plurality of positions, said first and second recordings extending in parallelism, circumferentially on said surface;

second means associated with the second control recording to provide a single pulse corresponding to said second recording;

a circuit connected to said first and second means for providing a signal corresponding to the deviation of the position of the head from a desired position; and means connected to said circuit and capable of energizing the head for movement thereof in response to said signal.

* * * * *

UNITED STATES PATENT AND TRADEMARK OFFICE
CERTIFICATE OF CORRECTION

PATENT NO. : 4,007,493
DATED : February 8, 1977
INVENTOR(S) : Michael I. Behr et al.

It is certified that error appears in the above-identified patent and that said Letters Patent are hereby corrected as shown below:

Col. 8, line 41, change "of" to --or--.
Col. 13, line 4, insert "a" at beginning of line.
line 10, insert "a" at beginning of line.
line 16, insert "a" at beginning of line.
line 25, change "nking" to --linking--.
line 29, insert "a" at beginning of line.

Signed and Sealed this

Third Day of May 1977

[SEAL]

Attest:

RUTH C. MASON
*Attesting Officer*

C. MARSHALL DANN
*Commissioner of Patents and Trademarks*